United States Patent [19]

Connelly et al.

[11] Patent Number: 4,545,902
[45] Date of Patent: Oct. 8, 1985

[54] FLOCCULANTS FOR BAUXITE (RED MUD)

[75] Inventors: Lawrence J. Connelly, Oak Lawn; Radhakrishnan Selvarajan, Oak Park, both of Ill.

[73] Assignee: Nalco Chemical Company, Oak Brook, Ill.

[21] Appl. No.: 650,955

[22] Filed: Sep. 17, 1984

[51] Int. Cl.$^4$ ............................................. B01D 21/01
[52] U.S. Cl. ....................................... 210/734; 209/5; 423/121; 423/122
[58] Field of Search .................. 209/5; 210/725, 727, 210/728, 734; 423/111, 121, 122

[56] References Cited

U.S. PATENT DOCUMENTS

| 3,390,959 | 7/1968 | Sibert | 210/734 |
| 3,397,953 | 8/1968 | Galvin et al. | 210/727 |
| 3,445,187 | 5/1969 | Sibert | 210/733 |
| 3,692,673 | 9/1972 | Hoke | 210/728 |
| 3,755,531 | 8/1973 | Tsukawaki et al. | 423/121 |
| 3,975,496 | 8/1976 | Smalley et al. | 423/122 |
| 4,342,653 | 8/1982 | Halverson | 210/912 |
| 4,478,795 | 10/1984 | Hereda et al. | 423/111 |

*Primary Examiner*—Peter Hruskoci
*Attorney, Agent, or Firm*—John G. Premo; Donald G. Epple

[57] ABSTRACT

Acrylic acid copolymers and certain acrylic acid acrylamide terpolymers which contain amounts of 2-AMPS provide superior results when used to remove suspended red mud from aqueous solutions which contain alumina.

3 Claims, No Drawings

FLOCCULANTS FOR BAUXITE (RED MUD)

INTRODUCTION

The present invention is concerned with an improved method of removing suspended red mud from aqueous alkaline alumina solutions.

The almost universally used process for the manufacture of alumina is the Bayer process. In its broadest aspects, this method is carried out almost exclusively in aqueous solutions and is achieved by reaction of bauxite and a strong base such as caustic soda in steam-heated autoclaves whereby the alumina is transformed into a soluble aluminate form. In this step, a considerable amount of insoluble impurities result or are released from the bauxite, which must be separated from the desired alumina constituent. These residues, commonly known as red muds, include iron oxides, sodium alumino-silicate, titanium oxide and other materials. Generally these muds appear as very fine particles which are difficult to separate out. Yet the red muds which usually constitute about 5-60% by weight of the ore must be rapidly and cleanly separated from the solubilized alumina liquor. It is important that the excess caustic also be recovered and reused in subsequent runs.

The separation of red mud from alumina and caustic solution is generally effected by first treating the red mud suspension or slurry with chemicals to promote coagulation of solids contained therein. The initial separation is then followed by a washing step. Specifically, the settled solids from the first treatment, normally an 8-25% solids slurry, is washed with hot caustic water. The solids content by this procedure is reduced to about 3-12%. The red mud is usually washed a plurality of times by counter-current techniques. The wash waters containing suspended red mud and dissolved alumina and caustic are then also treated with chemicals to promote settling. In order to make this particular step economically efficient, the chemical must promote rate of separation to a substantial degree. If the rate of separation is too slow, output is materially diminished and overall process efficiency impaired. Likewise, if the separation is not clean, the resultant alumina, in the form of aluminate, is somewhat crude and undesirable for a number of end-uses, or output may be reduced because of reduced cycle times in filtration.

It is now known that red mud suspensions may be efficiently separated from caustic solutions containing alumina by treating these suspensions with a water-soluble polymer which has a molecular weight of at least 50,000, which polymer contains at least 80% of recurring moieties selected from the group consisting of acrylic acid and acrylic acid salts. These polymers may be used either alone or in conjunction with starch. This technology is well documented in U.S. Pat. Nos.: 3,445,187, 3,390,959, and 3,397,953. The disclosures of these patents are incorporated herein by reference.

While acrylic acid polymers of the type described above give good results in removing suspended red mud from aqueous solutions of alumina, if such polymers could be improved whereby they were more efficient in their removal of suspended red mud from alumina solutions, an advance in the art would be made.

THE INVENTION

In a process of the type wherein water-soluble acrylic acid polymers are used to treat solutions of alumina and suspended red mud to remove the suspended red mud therefrom, the improvement which comprises using as the water-soluble acrylic acid polymer an acrylic acid copolymer or terpolymer from the group consisting of:
  (a) an acrylic acid copolymer which contains from 1-22% by weight of 2-AMPS[1], or
  (b) an acrylic acid terpolymer which contains from 1.0-10% by weight of 2-AMPS and from 2.5-10% by weight of acrylamide.

[1]2-AMPS=2-acrylamido-2-methylpropanesulfonic acid

In the above described acrylic acid 2-AMPS copolymer, it is preferred to use copolymers which contain 5-22% by weight of 2-AMPS with a most preferred range being 12-22% by weight.

In the case of the acrylic acid terpolymer, it is preferred to use 2.5-7.5% by weight of AMPS with a most preferred range being terpolymers containing 2.5-5% by weight.

With respect to the acrylamide content of such terpolymers, the preferred material should contain from 2.5-7.5% by weight of acrylamide and, preferably 2.5-5% by weight.

The 2-AMPS monomer and its use as a general flocculant in the form of its homo or copolymers is described in U.S. Pat. No. 3,692,673, the disclosure of which is incorporated herein by reference.

While the 2-AMPS described herein represents a preferred material for incorporation into the acrylic acid polymers for use in the described process, it will be understood the other monomers which contain propane sulfonic acid groups and are described in U.S. Pat. No. 3,692,673, are considered as equivalents to the 2-AMPS.

In the practice of the invention, the 2-AMPS when combined with the acrylic acid polymers is used either as its alkali metal, preferably sodium, or as its ammonium salt form.

The dosage of the polymers used in the practice of the invention may vary between 1 and 50 ppm, and, preferably, between 3–10 ppm, based on the alumina containing solution. The dosage will vary, however, depending on the level of suspended solids (red mud) in the solution.

The polymers used in the practice of the invention should have a molecular weight of at least 50,000 and, preferably greater than 100,000. Most preferred polymers have a molecular weight of 1,000,000 or more.

EXAMPLES

In order to illustrate the advantages of the invention, the following are presented by way of example.

TEST METHOD 20,000 ml of distilled $H_2O$ was placed into a water bath and allowed to reach the appropriate temperature. For the thickener feed, this was $+95°$ C. ($\sim 2$ hrs.). The washer train temperature was 72° C. The water bath was equipped with a rack which could hold twelve 1000 ml nalgene graduate cylinders which had their bases removed.

A well mixed sample of slurry was then portioned out into the twelve 1000 ml nalgene graduated cylinders by filling all the cylinders to the 500 ml graduation. The remaining 500 ml were then added to the cylinders in the opposite order. These cylinders were immediately placed in the bath. The hot $H_2O$ level in the bath should be high enough to cover the 1000 ml graduation.

The 1000 ml sample was then transferred to a stainless steel pot and heated to the appropriate temperature. The slurry was transferred back to the 1000 ml cylinder.

A 2.0% solution of flocculant was diluted to 0.1% with polymer makeup water (5-15 g/l caustic). The appropriate amount of flocculant was then diluted to 50 ml with the overflow from the first washer.

A cylinder was immediately mixed by 4 plunges with a plunger. The plunger was a 3/16" metal rod with a #10 rubber stopper attached to the bottom end. The mixer was allowed to fall freely on the downward stroke and lifted at the same speed on the upward stroke.

The test product was immediately added from a 50 ml graduate to the top of the slurry. Four plunges were then used to mix the slurry using the same technique described above.

The interface was then followed and recorded at time intervals of 15 seconds. (The interface was marked at appropriate time intervals on tape attached to the cylinder. The interface was followed until it passed the 4 inch mark, at which time the tape was removed and recorded. The settling rate was calculated using the time interval required for the interface to drop from the 1 inch mark to the 3 inch mark.)

Using the above experimental technique, the following tests were run.

The control, or that against which all tests were compared, was a commercial 100% sodium polyacrylate having an RSV[2] or 29-34 or a 100% ammonium polyacrylate having an RSV between 29-34. The results of the first eight tests were obtained using a sodium polyacrylate control. All others used an NH4 polyacrylate control. The results of the testing, which demonstrates the superiority of the polymers of the invention, are set forth below in Tables I and II.

[2]RSV = Reduced Specific Viscosity

TABLE I

|  | Na 2-AMPS (Wt. %) | Na Acrylate (Wt. %) | RSV | RR*[3] Settler | RR*[3] Washer |
|---|---|---|---|---|---|
| Polymer 1 | 6.2 | 93.8 | 31 | .90 | — |
| Polymer 2 | 12.0 | 88.0 | 32 | .70 | — |
| Polymer 3 | 22.0 | 78.0 | 31 | .65 | — |
| Polymer 4 | 39.0 | 61.0 | 22 | >5 | — |
| Polymer 1 | 6.2 | 93.8 | 31 | .90 | 0.82 |
| Polymer 2 | 12.0 | 88.0 | 32 | .63 | 0.96 |
| Polymer 3 | 22.0 | 78.0 | 31 | — | 1.03 |
| Polymer 4 | 39.0 | 61.0 | 22 | — | >2 |
| Polymer 5 | 1.0 | 99.0 | 36 | — | 0.92 |
| Polymer 6 | 2.5 | 97.5 | 36 | 0.89 | 0.84 |
| Polymer 7 | 5.0 | 95.0 | 36 | 0.76 | 0.86 |
| Polymer 8 | 7.5 | 92.5 | 38 | 0.92 | — |
| Polymer 9 | 10.0 | 90.0 | 36 | 0.85 | 0.80 |
| Polymer 10 | 12.5 | 87.5 | 36 | 0.80 | — |
| Polymer 11 | 15.0 | 85.0 | 38 | 0.75 | 0.76 |
| Polymer 6 | 1.0 | 99.0 | 36 | — | — |
| Polymer 6 | 2.5 | 97.5 | 36 | 1.0 | — |
| Polymer 7 | 5.0 | 95.0 | 36 | 0.87 | — |
| Polymer 8 | 7.5 | 92.5 | 38 | 0.85 | — |
| Polymer 9 | 10.0 | 90.0 | 36 | 0.90 | — |
| Polymer 10 | 12.5 | 87.5 | 36 | 0.83 | — |
| Polymer 11 | 15.0 | 85.0 | 38 | 0.88 | — |
| Polymer 12 | 20.0 | 80.0 | 32 | 0.73 | — |
| Polymer 13 | 30.0 | 70.0 | 26 | >6 | — |

[3]Replacement Ratio (RR) is calculated on an actives basis and is the amount of material required to give the same result as a known standard. An RR of 0.70 indicates that only 70% of the amount of the product (polymer) being tested was required to produce the same effect as the standard.

TABLE II

|  | NH4—2-AMPS (Wt. %) | AcAm (Wt. %) | NH4 Acrylate (Wt. %) | RSV | RR Settler | RR* Washer |
|---|---|---|---|---|---|---|
| Polymer 14 | 5.0 | 10.0 | 85.0 | 44 | 0.46 | 0.54 |
| Polymer 15 | 10.0 | 10.0 | 80.0 | 40 |  | 0.51 |
| Polymer 16 | 5.0 | 20.0 | 75.0 | 48 |  | 1.4 |
| Polymer 17 | 5.0 | 5.0 | 90.0 | 43 | 0.76, 0.68 | 0.71 |
| Polymer 18 | 10.0 | 5.0 | 85.0 | 42 | 0.63 |  |
| Polymer 19 | 2.5 | 7.5 | 90.0 | 44 | 0.72, 0.61 | 0.60 |
| Polymer 20 | 5.0 | 7.5 | 87.5 | 43 | 0.82, 0.71 | 0.64 |
| Polymer 21 | 7.5 | 7.5 | 85.0 | 44 | 0.77 |  |
| Polymer 22 | 10.0 | 7.5 | 82.5 | 43 | 1.05 |  |
| Polymer 23 | 1.0 | 10.0 | 89.0 | 43 | 0.90 |  |
| Polymer 24 | 2.5 | 10.0 | 87.5 | 43 | 1.3 |  |
| Polymer 14 | 5.0 | 10.0 | 85.0 | 44 | 1.8 |  |
| Polymer 25 | 7.5 | 10.0 | 82.5 | 42 | 1.9 |  |
| Polymer 26 | 2.5 | 2.5 | 95 | 38 | 0.93 |  |
| Polymer 27 | 5.0 | 2.5 | 92.5 | 38 | 0.83 | 0.45 |
| Polymer 28 | 7.5 | 2.5 | 90 | 40 | 0.71 | 0.43 |
| Polymer 29 | 2.5 | 5.0 | 92.5 | 40 | 0.71 | 0.41 |
| Polymer 17 | 5.0 | 5.0 | 90 | 43 | 0.74 | 0.36 |
| Polymer 30 | 7.5 | 5.0 | 87.5 | 42 | 0.92 |  |
| Polymer 31 | 2.5 | 7.5 | 90 | 44 | 0.60 | 0.38 |
| Polymer 32 | 5.0 | 7.5 | 87.5 | 43 | 0.99 |  |
| Polymer 21 | 7.5 | 7.5 | 85.0 | 44 | 1.83 |  |

*RR is calculated on an actives basis and is the amount of material required to give the same result as a known standard.

We claim:

1. In a process of the type wherein water-soluble acrylic acid polymers are used to treat solutions of alumina and suspended red mud and the suspended red mud is flocculated and settled therefrom, the improvement which comprises using as the water-soluble acrylic acid polymer between 1-50 ppm based on the weight of the solutions of alumina of an acrylic acid copolymer or terpolymer having a molecular weight of at least 1,000,000 from the group consisting of:
   (a) an acrylic acid copolymer which contains from 1-22% by weight of 2-acrylamido-2-methylpropanesulfonic acid and from 18-99% by weight of sodium or ammonium acrylate or
   (b) an acrylic acid terpolymer which contains from 2.5-7.5% by weight of 2-acrylamido-2-methylpropanesulfonic acid and from 2.5-7.5% by weight of acrylamide and at least 85.0% by weight of sodium or ammonium acrylate.

2. In a process of the type wherein water-soluble acrylic acid polymers are used to treat solutions of alumina and suspended red mud, and the suspended red mud is flocculated and settled therefrom, the improvement which comprises using as the water-soluble acrylic acid polymer between 1-50 ppm based on the weight of the solutions of alumina of an acrylic acid copolymer of terpolymer having a molecular weight of at least 1,000,000 from the group consisting of:
  (a) an acrylic acid copolymer which contains from 5-22% by weight of 2-acrylamido-2-methylpropanesulfonic acid and 78-95% by weight sodium or ammonium acrylate, or
  (b) an acrylic acid terpolymer which contains from 2.5-7.5% by weight of 2-acrylamido-2-methylpropanesulfonic acid and from 2.5-7.5% by weight of acrylamide and at least 85.0% by weight of sodium or ammonium acrylate.

3. In a process of the type wherein water-soluble acrylic acid polymers are used to treat solutions of alumina and suspended red mud, and the suspended red mud is flocculated and settled therefrom, the improvement which comprises using as the water-soluble acrylic acid polymer between 1-50 ppm based on the weight of the solutions of alumina of an acrylic acid copolymer or terpolymer having a molecular weight of at least 1,000,000 from the group consisting of:
  (a) an acrylic acid copolymer which contains from 12-22% by weight of 2-acrylamido-2-methylpropanesulfonic acid and 78-88% by weight of sodium or ammonium acrylate, or
  (b) an acrylic acid terpolymer which contains from 2.5-5% by weight of 2-acrylamido-2-methylpropanesulfonic acid and from 2.5-5% by weight of acrylamide and 90-95% by weight of sodium or ammonium acrylate.

* * * * *